June 21, 1960     E. J. McCLOSKEY     2,941,628
BACK STOPS
Filed May 27, 1958     2 Sheets-Sheet 1
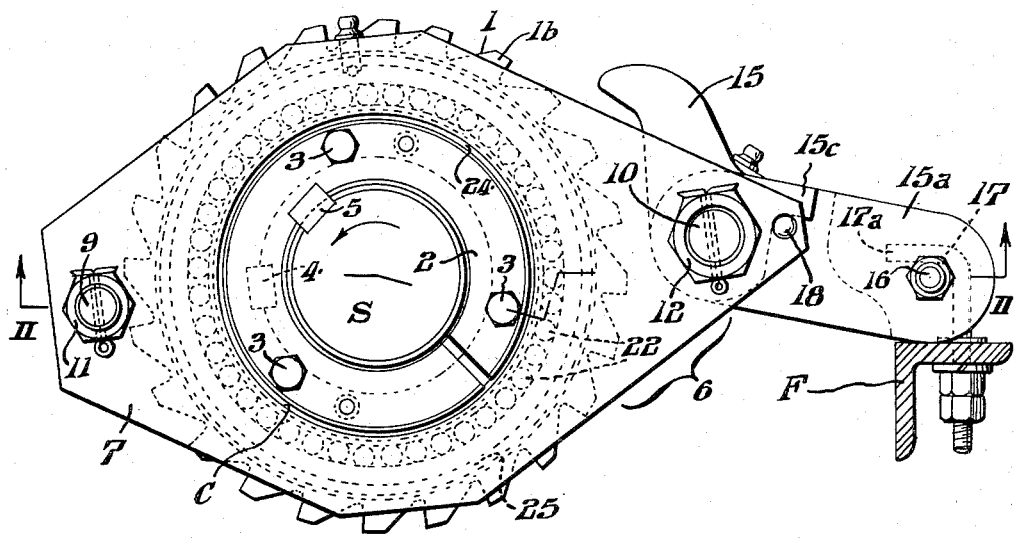
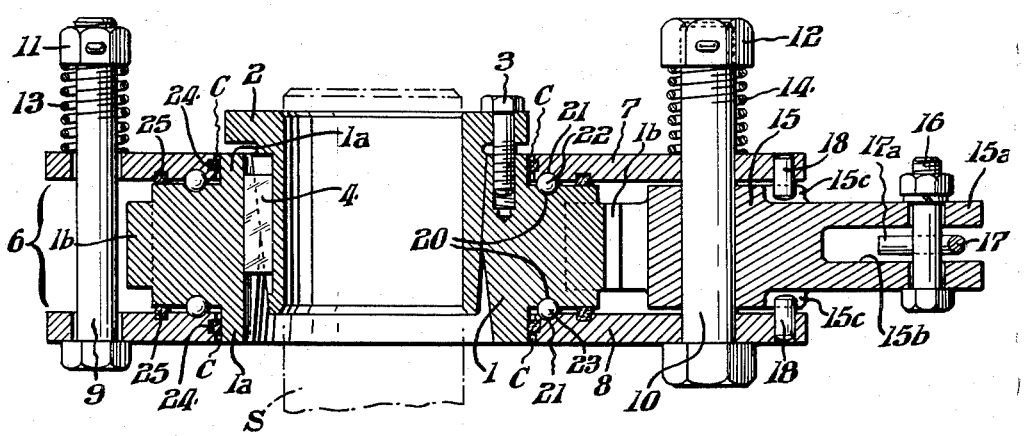
INVENTOR.
Ellsworth J. McCloskey,
BY Paul & Paul
ATTORNEYS.

June 21, 1960

E. J. McCLOSKEY 2,941,628

BACK STOPS

Filed May 27, 1958

INVENTOR.
Ellsworth J. McCloskey,
BY Paul & Paul
ATTORNEYS.

United States Patent Office 2,941,628
Patented June 21, 1960

2,941,628

BACK STOPS

Ellsworth J. McCloskey, Norristown, Pa., assignor to The American Pulley Company, a corporation of Pennsylvania Filed May 27, 1958, Ser. No. 738,207

2 Claims. (Cl. 188—82.7)

This invention relates to back stops, i.e. to devices for preventing reverse rotation of machine shafts, the present application being a continuation in part of a previous application Ser. No. 616,983, filed by me on October 19, 1956, now abandoned.

In such devices, as ordinarily constructed, a detent fulcrumed at one end of a rocker arm has side components which are maintained by spring pressure, in frictional engagement with opposite side faces of a ratchet wheel fast on the shaft of a machine, said detent being provided with a rearward tail projection having a sliding pivotal connection with a restraining element on a fixed part of the machine framing so as to be normally held retracted from the wheel, but which, upon reverse rotation of the shaft, is automatically brought into engagement with said wheel. Due to the friction between the opposing bearing surfaces of the side components of the rocker arm and the wheel by the spring pressure, and due to entry of dirt and grime filtering into said surfaces, rapid wear takes place with attendant "freezing" and failure of the device to function.

The chief aim of my invention is to obviate to the contingencies above referred to.

How this desiderata and other objects and advantages are realized in practice will appear from the following detailed description of the attached drawings, wherein:

Fig. 1 is a view, in side elevation, of a back stop conveniently embodying my invention.

Fig. 2 is a longitudinal section taken as indicated by the angled arrows II—II in Fig. 1.

Figure 3:
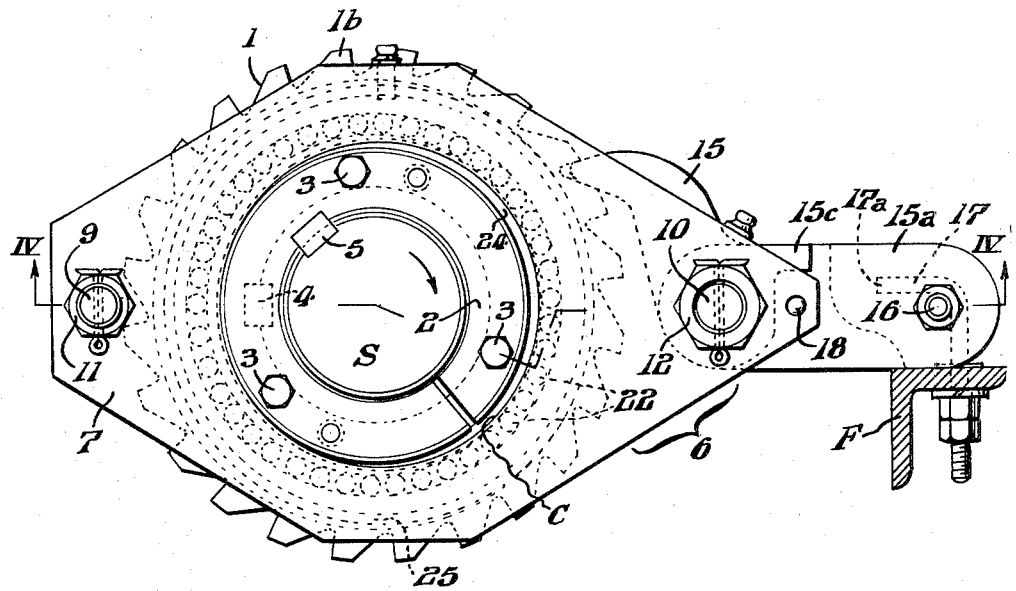
Fig. 3 is a view similar to Fig. 1 showing the back stop in its operative position to prevent reverse shaft rotation.

As herein illustrated the back stop of my invention comprises a ratchet wheel 1 which is mounted upon a split wedge bushing 2 secured, by tightening of clamp screws 3, upon a machine shaft S that normally rotates in the direction of the arrow in Fig. 1. As shown, the ratchet wheel 1 is keyed to the bushing 2 at 4, and the bushing to the shaft at 5. The rocker arm, comprehensively designated 6, is of multipartite construction, the side members 7 and 8 thereof being fashioned from heavy plate metal and apertured medially to surround the hub extensions 1a at opposite sides of the wheel 1, with a slight annular clearance, as more or less exaggeratedly shown at C in Figs. 1 and 2. The shanks of the headed bolts, designated 9 and 10 respectively, are passed through holes at opposite ends of the side components 7 and 8 of the rocker arm 6; and in compression between nuts 11 and 12 at the distal ends of said bolts and the component 7 are helical spirngs 13 and 14 respectively. Fulcrumed on the bolt 10 between the side components of the rocker arm 6 is a detent 15 having a tail prolongation 15a which rests upon a fixed frame member F and which is clevised as at 15b. A bolt 16, extending crosswise of the clevis 15b, is engaged beneath the hook projection 17a of a restraining element 17 anchored in the fixed frame member F with capacity for sliding pivotal movement. Clockwise movement of the detent 15 about the bolt 16 is limited by engagement of lateral stop lugs 15c with inwardly projecting studs 18 on the rocker arm components 7 and 8 as shown in Figs. 1 and 2. As the shaft S normally rotates in the direction of the arrow in Fig. 1, the detent 15 will be held retracted through drag imposed upon the rocker arm 6 by the ratchet wheel 1.

In order to facilitate the action of the back stop and to prevent entry of dirt to the bearing surfaces between the wheel 1 and the side components 7 and 8 of rocker arm 6, I have made provisions as follows: As shown, the opposite side faces of the wheel 1 are formed respectively with concentric annular grooves 20 and the confronting inner side faces of the rocker arm components 7 and 8 and the wheel hubs 1a with complemental grooves 21 to serve as races for bearing balls 22 and 23. Through interposition of the bearing balls 22 and 23, direct contact of the rocker arm components 7 and 8 with the side faces of the wheel hubs 1a is prevented and friction thereby reduced to a minimum to allow free movement of said arm about the hubs of said wheel. As further shown, resilient packing rings 24 and 25 of felt or the like, recessed into annular grooves respectively around the apertures in the side components 7 and 8 of the rocker arm 6 and in the inner faces of said components, serve to exclude dirt and grime from the bearing balls 22 and 23 and at the same time, to retain oil or grease by which the balls and the contacting bearing surfaces are lubricated.

In the event that, for some reason, the shaft S should tend to rotate reversely, i.e., turn in the direction of the arrow in Fig. 3, the rocker arm 6 is dragged about in the same direction with the result that the detent 15 will be bodily swung downwardly about the bolt 16 as an axis and at the same time pivot on the bolt 10 to engage one of the teeth 1b of the wheel 1 and thereby check such rotation.

Figure 4:
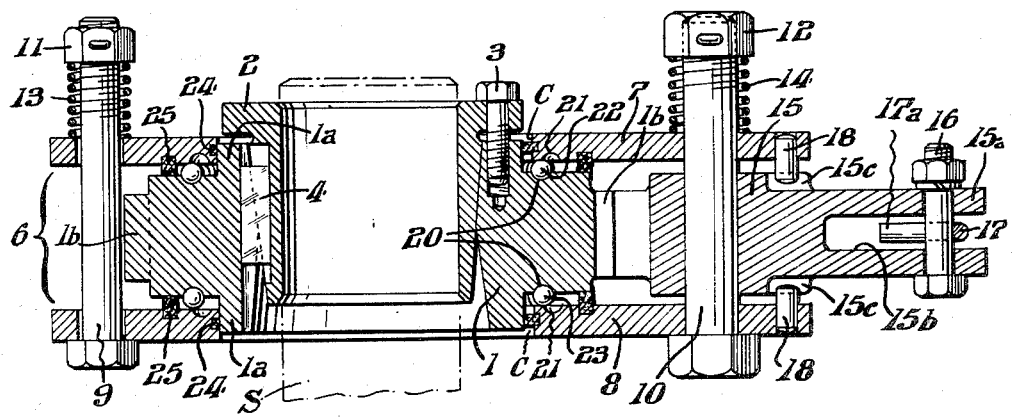
Fig. 4 is a longitudinal section taken as indicated by the angled arrows IV—IV in Fig. 3.

Due to the clearances C between the side components 7 and 8 of the rocker arm 6 and the hub projections 1a of the toothed wheel 1, said arm will be shifted bodily to the right upon engagement of the detent 15 with said wheel as shown in Fig. 4. The grooves 21 are thereby slightly displaced relative to the balls 22 and 23, and the side components 7 and 8 spread apart against the resistance of the springs 13 and 14. Accordingly, it will be seen from Fig. 4 that, through engagement of the edges of the openings in the side components 7 and 8 of the arm 6 with the hubs 1a of the wheel 1, the load will be taken off the balls 22 and 23 with consequent reduction of the bearing friction and preclusion of rapid wear of the parts. The back stop can therefore be relied upon to function instantaneously and smoothly in the event of any tendency of the shaft S to rotate reversely.

While the preferred embodiment of this invention has been described in some detail, it will be obvious to one skilled in the art that various modifications may be made therein without departing from the invention as hereinafter claimed.

Having thus described my invention I claim:

1. In a back stop having a ratchet toothed wheel affixed to a shaft which is to be restrained against reverse rotation, a rocker arm comprising side components respectively engaged, with substantial annular clearances, about hub projections at opposite sides of the wheel; spring means yieldingly urging the side components of the rocker arm laterally toward the wheel; a normally retracted detent fulcrumed between the distal ends of the side components of the rocker arm, said detent being provided with a tail portion having a sliding pivotal connection with a fixed anchorage, and lateral lugs at opposite sides of the tail portion overreaching stop projections on the side components of the rocker arm and normally in engagement with said projections to prevent the rocker arm from turning with the wheel and to keep the detent retracted from said wheel; raceway grooves respectively in the opposite side faces of the toothed wheel and in the confronting faces of the rocker arm components; and bearing balls normally engaged in the aforesaid grooves with intervention of clearance intervals between the confronting faces of the side components of the rocker arm and the side faces of the wheel for capacity of said components to yield laterally against the pressure of the spring means upon slight endwise shifting of the arm bodily as the detent is engaged with teeth of the wheel to stop the shaft upon reverse rotation.

2. The invention according to claim 1, further including packing rings of felt or the like surrounding the rings of bearing balls and lodged in corresponding annular grooves respectively in the end faces of the wheel hub projections and in the confronting faces of the side components of the rocker arm.

References Cited in the file of this patent

UNITED STATES PATENTS

| | | |
|---|---|---|
| 2,001,810 | Zwald | May 21, 1935 |
| 2,079,106 | Cirac et al. | May 4, 1937 |
| 2,341,753 | Zwald | Feb. 15, 1944 |
| 2,687,785 | Whitney | Aug. 31, 1954 |